D. SPENCER.
Grain Separator.

No. 26,208.  Patented Nov. 22, 1859.

Witnesses  
Inventor  
Daniel Spencer

UNITED STATES PATENT OFFICE.

DANIEL SPENCER, OF CORTLAND, NEW YORK.

GRAIN-SEPARATOR.

Specification of Letters Patent No. 26,208, dated November 22, 1859.

*To all whom it may concern:*

Be it known that I, DANIEL SPENCER, of Cortland, in the county of Cortland and State of New York, have invented a new and useful Improvement in Grain-Separators; and I do hereby declare that the following is a full, clear, and exact description of the same, reference being had to the annexed drawings, making a part of this specification, in which—

Figure 1:
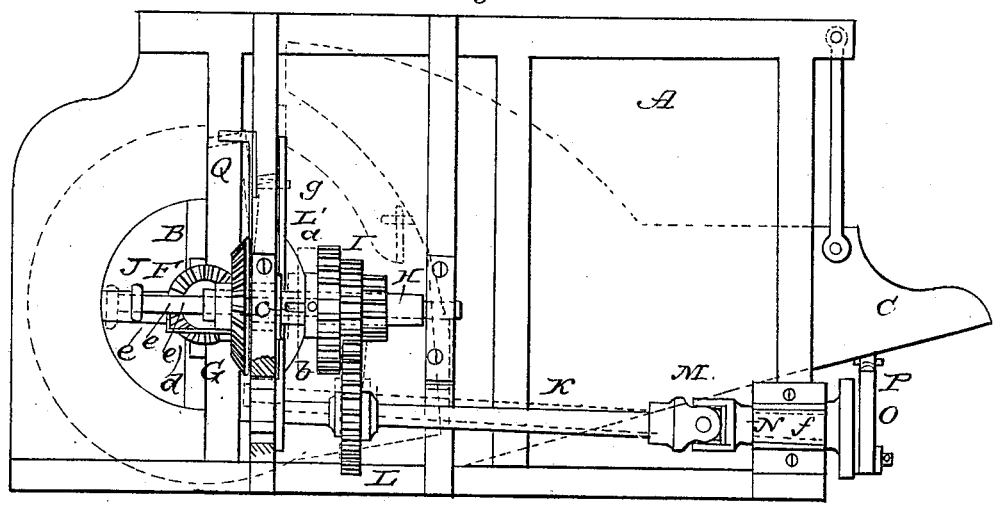
Figure 2:
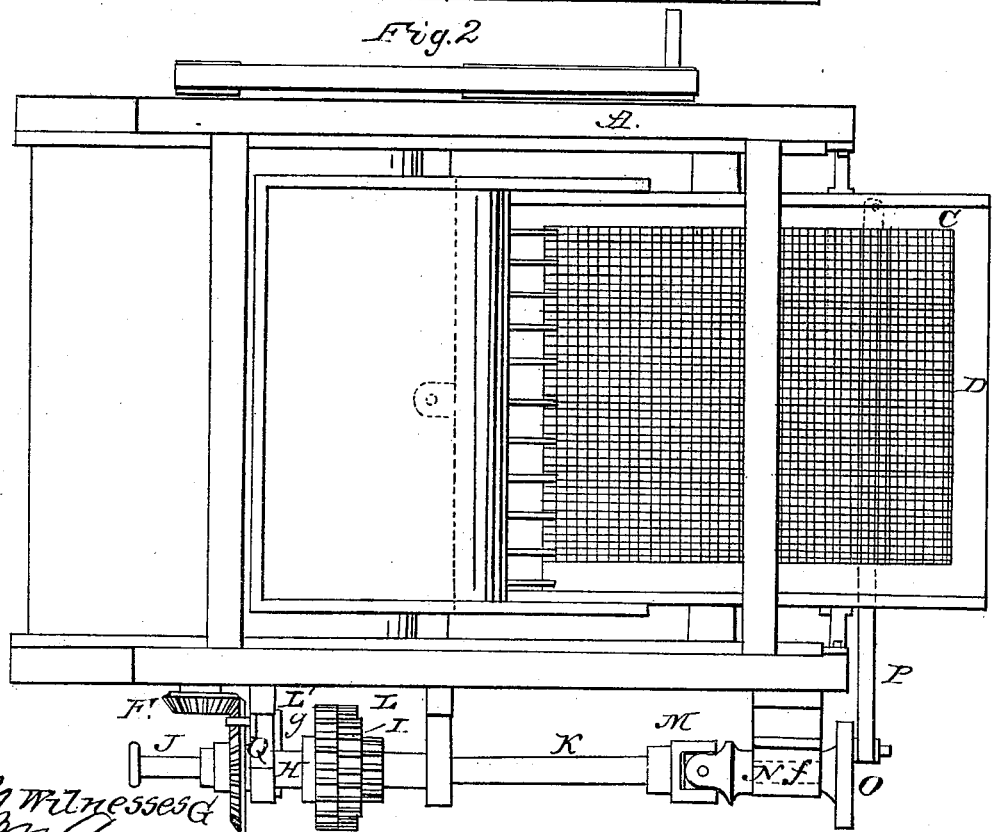

Figure 1, is a side view of my invention. Fig. 2, is a plan or top view of the same.

Similar letters of reference indicate corresponding parts in the two figures.

The object of this invention is to obtain a simple and efficient means for regulating the speed of the shake movement of the shoe of the separator so that the vibrations of the same may be made quicker or slower as may be required without changing the speed of the fan.

In order to separate grain from foreign substances by means of screens, the shake motion of the latter should vary according to the state or condition of the grain.—If very dirty and mixed grain is to be cleaned and separated, the screens should have a quick movement in order to work effectually, and if the grain be but little mixed and tolerably free from dirt, a slow movement would be required as a quick movement in the latter case would cause a portion of the impurities and foreign substances to pass through the screen with the grain.

To enable those skilled in the art to fully understand and construct my invention I will proceed to describe it.

A, represents a case in one end of which a rotating fan B, is placed, and C, is a shoe which is suspended within the case A, as usual and provided with one or more screens D. To one end of the fan shaft E, a bevel pinion F, is attached, and this pinion gears into a bevel wheel G, which is placed on one end of a shaft H, the bearings of which are attached to one side of the case A. On the shaft H, a series of wheels I, are placed and allowed to slide back and forth thereon. The wheels are permanently connected to each other and vary in size like a set of cone pulleys, as shown in both drawings. The shaft H, is hollow and a rod J, is fitted therein and is attached by a pin *a*, to a hub *b*, on one of the wheels I, the pin *a*, passing through a slot *c*, in shaft H, see Fig. 1. To the hub of the wheel G, a spring catch *d*, is attached, said catch fitting in either of a series of notches *e*, rod J.

Below the shaft H, there is a shaft K, on which a toothed wheel L, is secured. One end of this shaft has its bearing in a slide L′, attached to the strip that forms a bearing for the shaft H, and the opposite end is connected by a universal joint M, to a short shaft N, the bearing *f*, of which is attached to the side of the case A. To the outer end of the shaft N, a crank pulley O, is attached from which a shake motion is given the shoe C, by a connecting rod P. The slide L′, is allowed to rise and fall freely and it may be adjusted at the desired height by means of a spring catch Q which is simply a pin *g*, attached to a spring the pin passing into holes in the slide L′.

The operation is as follows:—As the fan B, rotates, a rotary motion is given the shaft H, by the gearing F, G. The wheels I, rotate with the shaft H, and communicate a rotary motion to the shaft K, either of the wheels I, being thrown in gear with the wheel L, by adjusting the rod J, and raising the slide L′, so that the wheel L, may gear into either wheel I. The spring catch *d*, retains either wheel I, in a position directly over the wheel L, and the spring catch Q, retains the shaft K, so that wheel L, may be kept in gear with either of the wheels I. The universal joint M, admits of the adjustment of the wheel L, with either of the wheels I, and the consequent inclining of the shaft K.

When the screen requires a quick movement the largest wheel I, is thrown in gear with wheel L, and when a slow movement is required the smallest wheel I, is thrown in gear with it, the middle wheel being thrown in gear with wheel L, when a moderate shake motion is required, it being understood that the speed of the fan B, is constant or not variable with that of the shoe and screen.

The plan hitherto practiced so far as I am aware for regulating the action of the shoe or screen has been to vary the length of movement of the screen the speed being the same. This plan is not very effectual and consequently the grain cannot be so perfectly separated as by my invention.

Having thus described my invention what I claim as new and desire to secure by Letters Patent, is:

The combination with a grain separator, between the fan shaft and the separating screens, of a shaft H and a series of sliding wheels I, substantially as shown, for the purpose set forth.

DANIEL SPENCER.

Witnesses:
WM. ANDRUS,
B. R. WILLIAMS.